US011255424B2

(12) United States Patent
Martin

(10) Patent No.: US 11,255,424 B2
(45) Date of Patent: Feb. 22, 2022

(54) AXLE ASSEMBLY HAVING AN INTERNAL LUBRICANT PASSAGE

(71) Applicant: ArvinMeritor Technology, LLC, Troy, MI (US)

(72) Inventor: Robert Martin, Harrison Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 149 days.

(21) Appl. No.: 16/813,452

(22) Filed: Mar. 9, 2020

(65) Prior Publication Data

US 2021/0277989 A1    Sep. 9, 2021

(51) Int. Cl.
*F16H 57/04* (2010.01)
*F16H 48/36* (2012.01)
*H02K 9/19* (2006.01)

(52) U.S. Cl.
CPC ... *F16H 57/0424* (2013.01); *F16H 2048/364* (2013.01); *H02K 9/19* (2013.01)

(58) Field of Classification Search
CPC .. F16H 57/0424; F16H 2048/364; H02K 9/19
See application file for complete search history.

(56) References Cited

U.S. PATENT DOCUMENTS

| | | | |
|---|---|---|---|
| 2,338,154 A | 1/1944 | Wilkinson | |
| 3,249,188 A | 5/1966 | Maina | |
| 3,631,741 A | 1/1972 | Kelbel | |
| 4,480,492 A | 11/1984 | Fujioka | |
| 5,603,671 A | 2/1997 | Schmidt | |
| 7,530,912 B2 | 5/2009 | Kramer | |
| 8,858,379 B2 | 10/2014 | Keeney et al. | |
| 9,719,563 B2 | 8/2017 | Hirao | |
| 10,823,276 B2 * | 11/2020 | Francis | B60K 1/00 |
| 2011/0230292 A1 | 9/2011 | Komatsu et al. | |
| 2012/0286607 A1 | 11/2012 | Shimizu et al. | |
| 2013/0019707 A1 | 1/2013 | Ebihara et al. | |
| 2013/0283972 A1 | 10/2013 | Yamamoto et al. | |
| 2014/0190781 A1 | 7/2014 | Lawson et al. | |
| 2018/0076687 A1 * | 3/2018 | Pritchard | B60K 7/0007 |
| 2018/0172138 A1 * | 6/2018 | Nakano | F16H 57/037 |
| 2018/0328480 A1 | 11/2018 | Nakano et al. | |
| 2019/0054816 A1 | 2/2019 | Garcia et al. | |

(Continued)

FOREIGN PATENT DOCUMENTS

DE   102018111419 A1   11/2019
JP      5557147 B2    7/2014

OTHER PUBLICATIONS

Extended European Search Report dated Jul. 2, 2021 for related European Application No. 21159492.4; 10 Pages.

(Continued)

*Primary Examiner* — Jake Cook
(74) *Attorney, Agent, or Firm* — Brooks Kushman PC

(57) ABSTRACT

An axle assembly having at least one lubricant passage. A differential carrier, a motor housing, and a cover may cooperate to at least partially define a first lubricant passage that routes lubricant from an axle housing to the cover. The differential carrier, motor housing, and cover may cooperate to at least partially define a second lubricant passage that routes lubricant from the cover to the axle housing.

20 Claims, 14 Drawing Sheets

(56) References Cited

U.S. PATENT DOCUMENTS

| | | |
|---|---|---|
| 2019/0054817 A1 | 2/2019 | Garcia et al. |
| 2019/0054818 A1 | 2/2019 | Garcia et al. |
| 2019/0063590 A1* | 2/2019 | Pydin .................. B60K 17/043 |
| 2019/0178365 A1 | 6/2019 | Ishikawa et al. |
| 2019/0366838 A1 | 12/2019 | Hirao et al. |

OTHER PUBLICATIONS

Dhanapal, et al., U.S. Appl. No. 16/205,586, filed with the United States Patent and Trademark Office on Nov. 30, 2018.
Smith, et al., U.S. Appl. No. 16/205,623, filed with the United States Patent and Trademark Office on Nov. 30, 2018.
Smith, et al., U.S. Appl. No. 16/206,182, filed with the United States Patent and Trademark Office on Nov. 30, 2018.
Soffner, et al., U.S. Appl. No. 16/205,663, filed with the United States Patent and Trademark Office on Nov. 30, 2018.
Begov et al., U.S. Appl. No. 16/205,717, filed with the United States Patent and Trademark Office on Nov. 30, 2018.
Smith, et al., U.S. Appl. No. 16/205,771, filed with the United States Patent and Trademark Office on Nov. 30, 2018.
Peng, et al., U.S. Appl. No. 16/205,850, filed with the United States Patent and Trademark Office on Nov. 30, 2018.

* cited by examiner

AXLE ASSEMBLY HAVING AN INTERNAL LUBRICANT PASSAGE

TECHNICAL FIELD

This disclosure relates to an axle assembly having at least one lubricant passage that may be at least partially defined by a motor housing.

BACKGROUND

An axle assembly having an electric motor module is disclosed in U.S. Pat. No. 8,858,379.

SUMMARY

In at least one embodiment an axle assembly is provided. The axle assembly may include an axle housing, a differential carrier, and an electric motor module. The axle housing may receive a differential assembly and may at least partially define a sump portion that receives lubricant. The differential carrier may be mounted to the axle housing and may support the differential assembly. The electric motor module may include a motor housing, a cover, a stator, and a rotor. The motor housing may be mounted to the differential carrier and may receive the stator and the rotor. The rotor may be rotatable about an axis. The cover may be mounted to the motor housing opposite the differential carrier. The differential carrier, the motor housing, and the cover may cooperate to at least partially define a first lubricant passage that receives lubricant from the axle housing and routes lubricant to the cover. A portion of the first lubricant passage that is defined by the motor housing may be radially positioned further from the axis than the stator.

The differential carrier, motor housing, and cover may cooperate to at least partially define a second lubricant passage that returns lubricant to the axle housing. A portion of the second lubricant passage that is defined by the motor housing may also be radially positioned further from the axis than the stator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
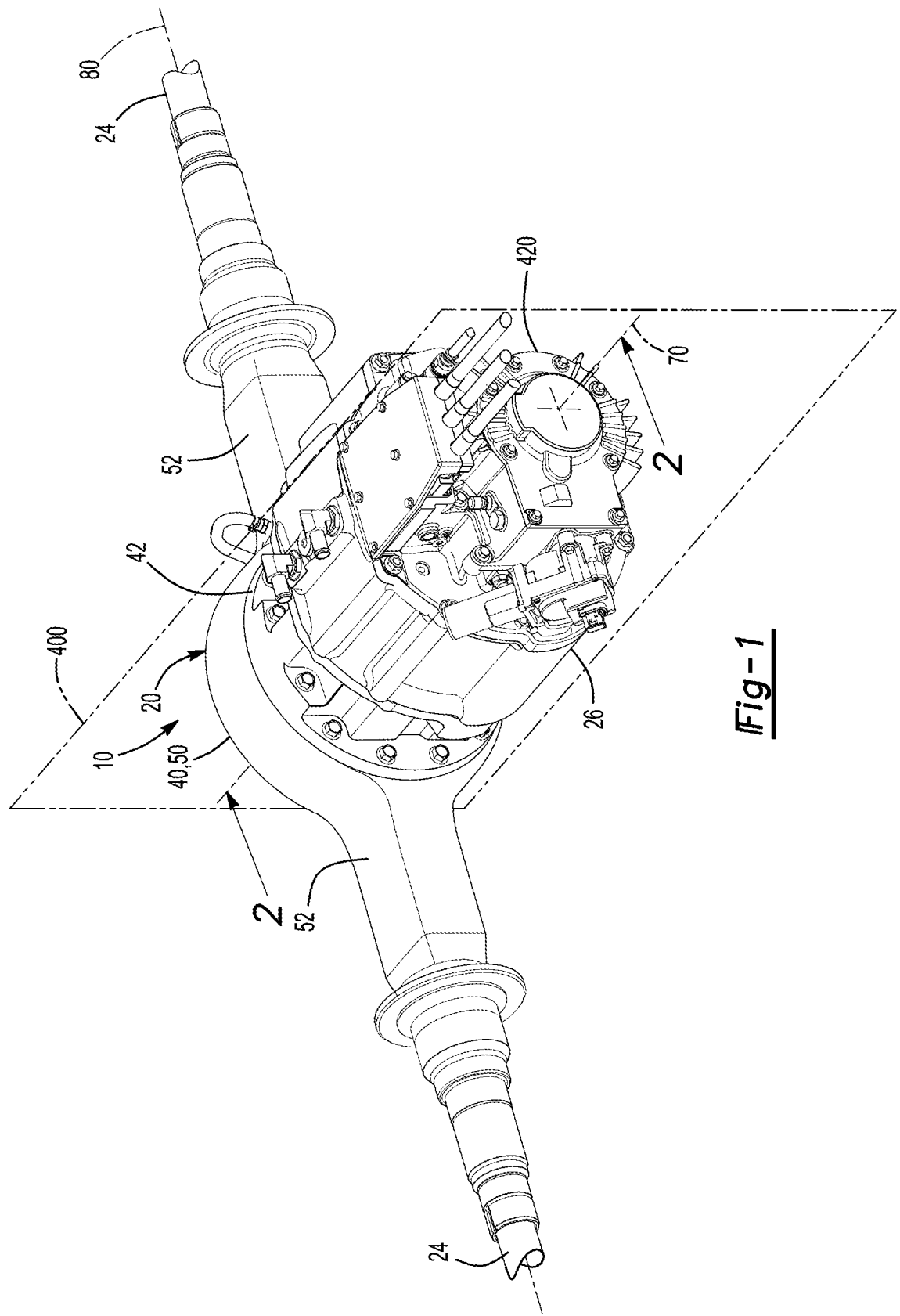
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 12:
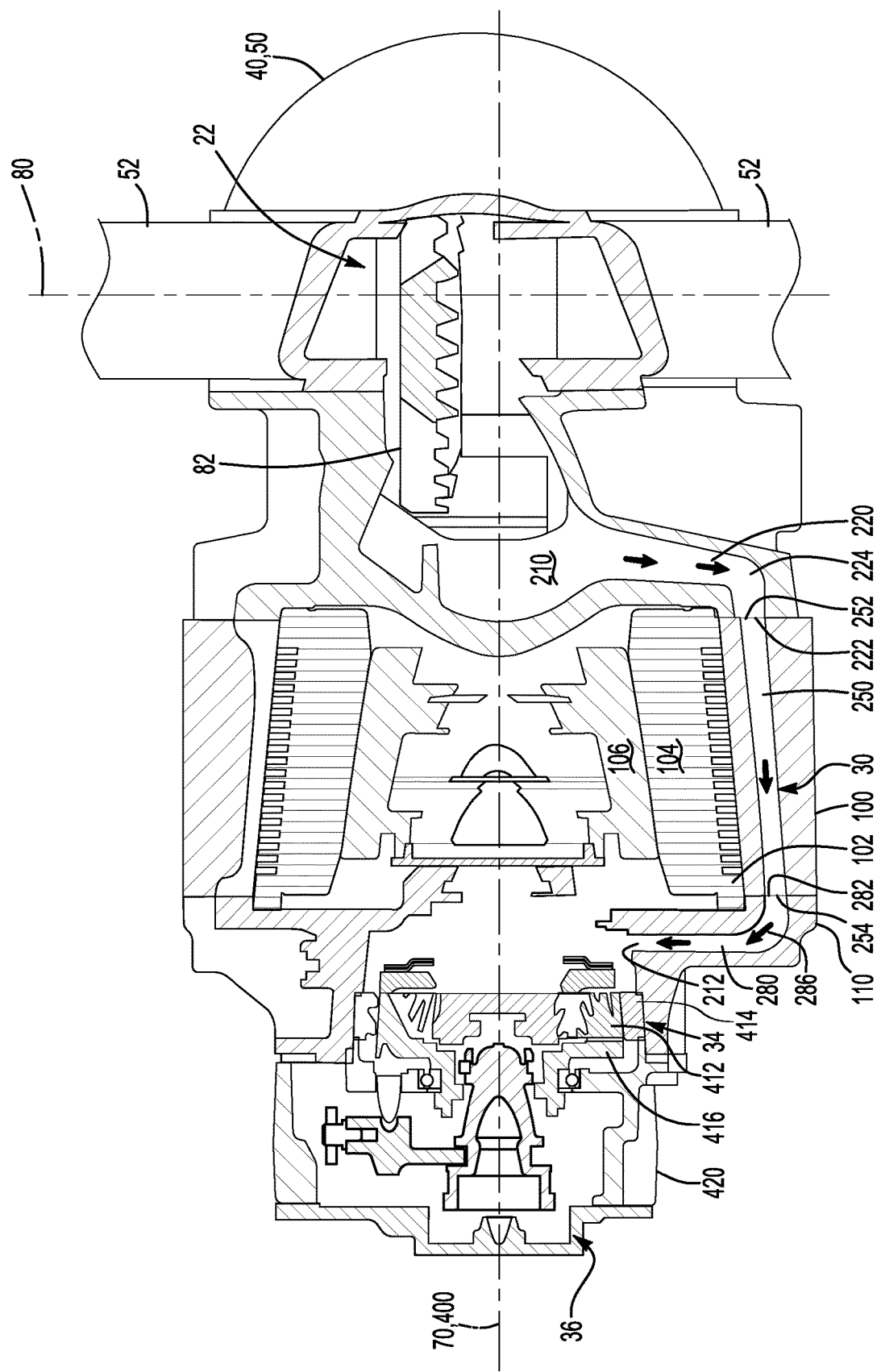
FIG. 12 is a section view of the axle assembly along section line 12-12.
Figure 14:
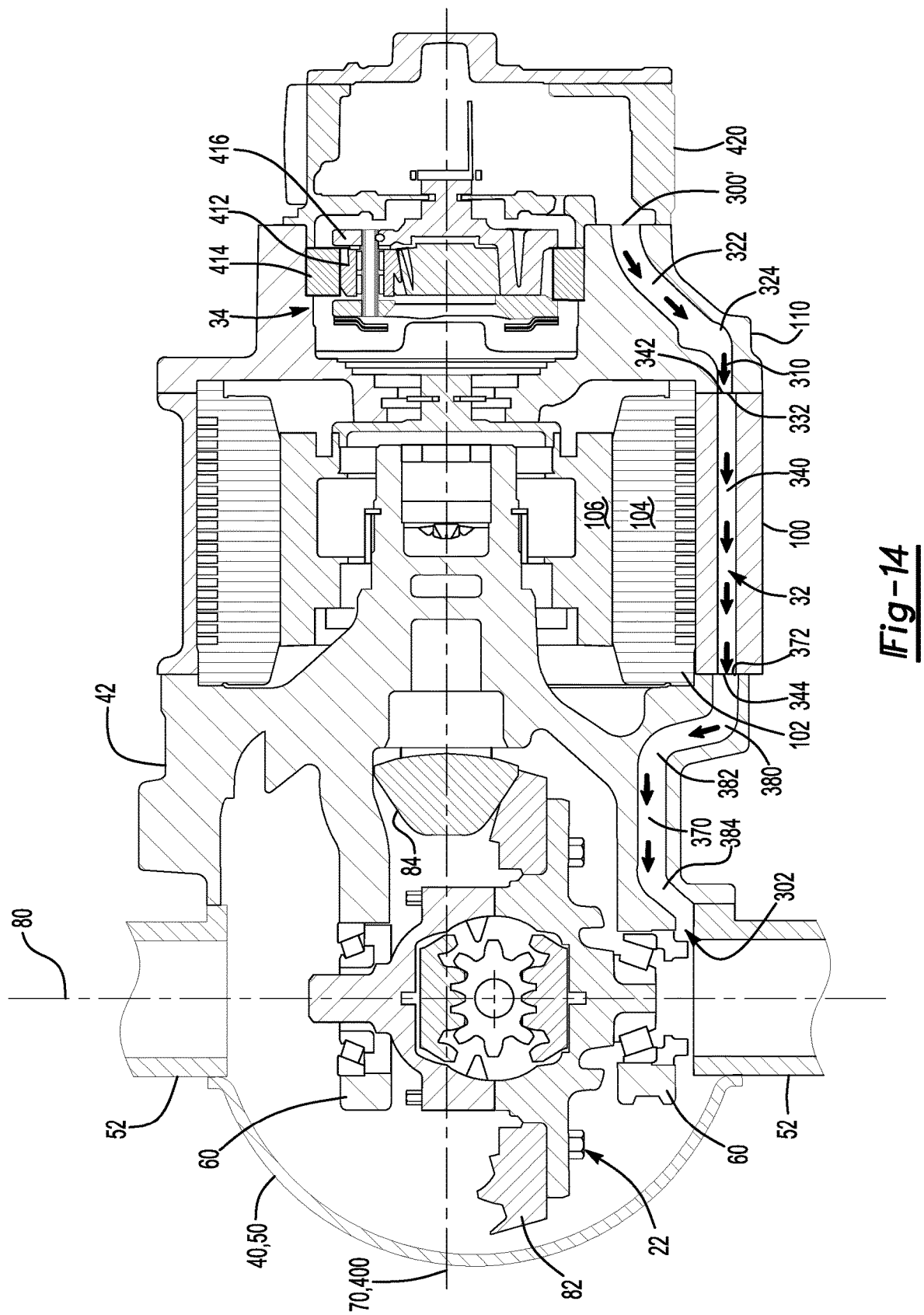
FIG. 14 is a section view of the axle assembly along section line 14-14 with axle shafts omitted for clarity.

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIGS. 12 and 14, the axle assembly 10 may also include a first lubricant passage 30, a second lubricant passage 32, a gear reduction module 34, a shift mechanism 36, or combinations thereof.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

Figure 2:
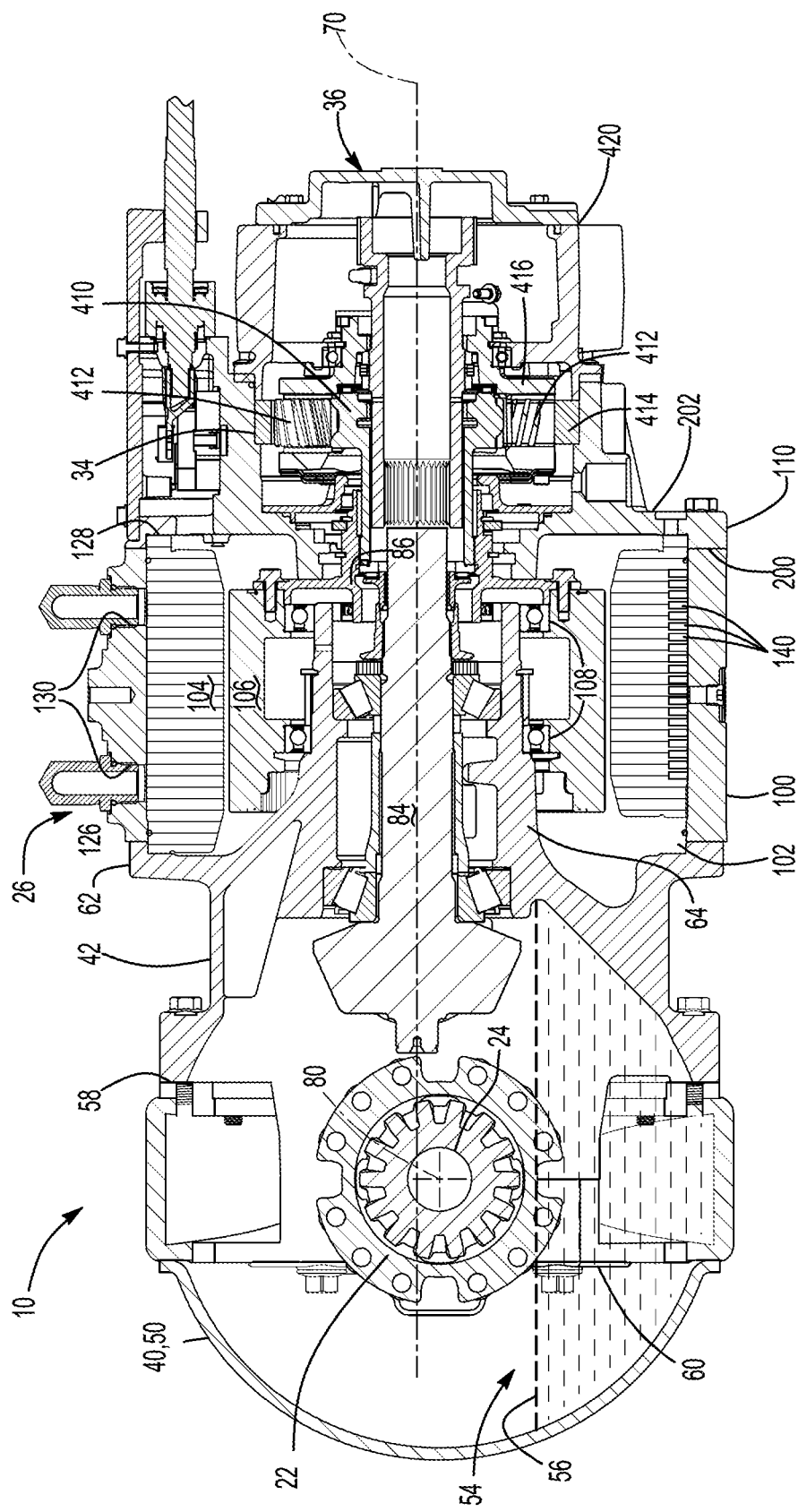
FIG. 2 is a section view of the axle assembly along section line 2-2.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 as will be discussed in more detail below.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. As is best shown with reference to FIGS. 2-4, the differential carrier 42 may include one or more bearing supports 60, a mounting flange 62, and a bearing support wall 64.

Figure 3:
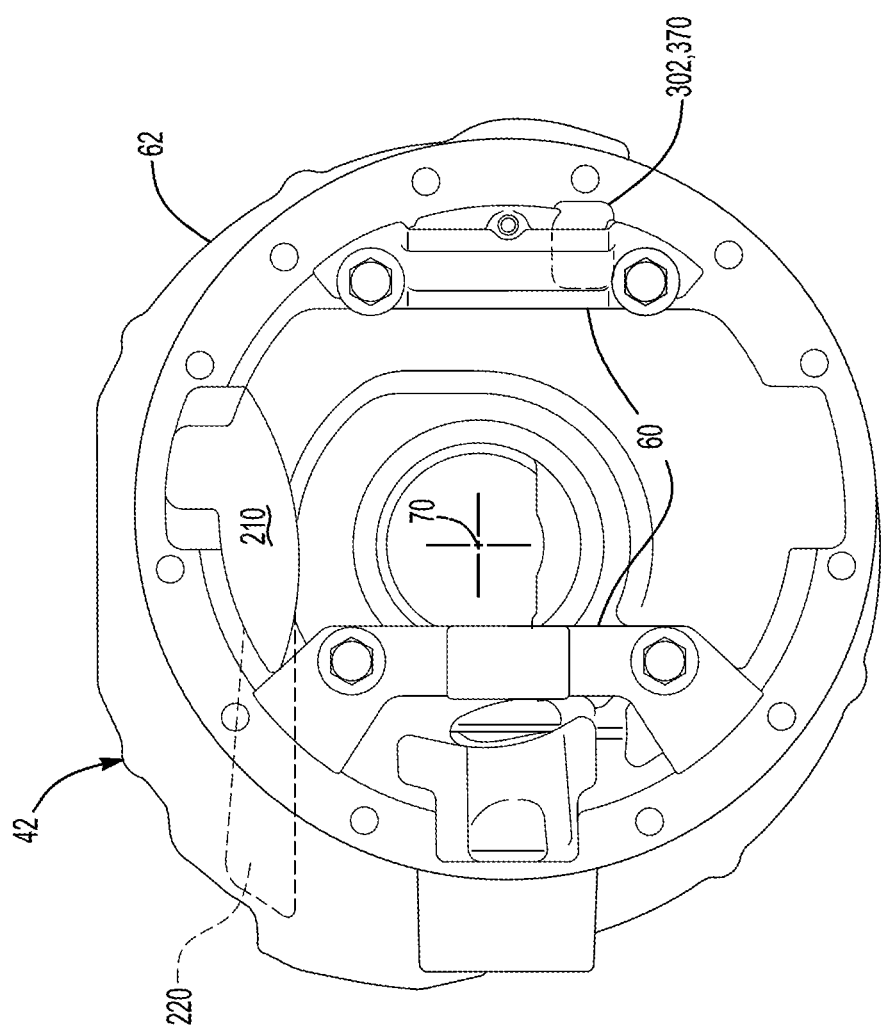
FIG. 3 is a side view of a differential carrier that may be provided with the axle assembly.

Referring primarily to FIGS. 2 and 3, a bearing support 60 may support a roller bearing assembly that may rotatably support the differential assembly 22. For example, two bearing supports 60 may be received in the center portion 50 and may be located proximate opposite sides of the differential assembly 22. The bearing support 60 may be provided in various configurations. For example, a bearing support 60 may include a pair of legs that extend from the differential carrier 42. A bearing cap may be mounted to the legs and may arch over a roller bearing assembly that may rotatably support the differential assembly 22. As another example, the bearing support 60 may be received in a roller bearing assembly, which in turn may support the differential assembly 22.

The mounting flange 62 may facilitate mounting of the electric motor module 26. The mounting flange 62 may be configured as a ring that may extend outward and away from an axis 70 and may extend around the axis 70. The mounting flange 62 may include a set of fastener holes that may be configured to receive a fastener that may secure the electric motor module 26 to the mounting flange 62.

Figure 4:
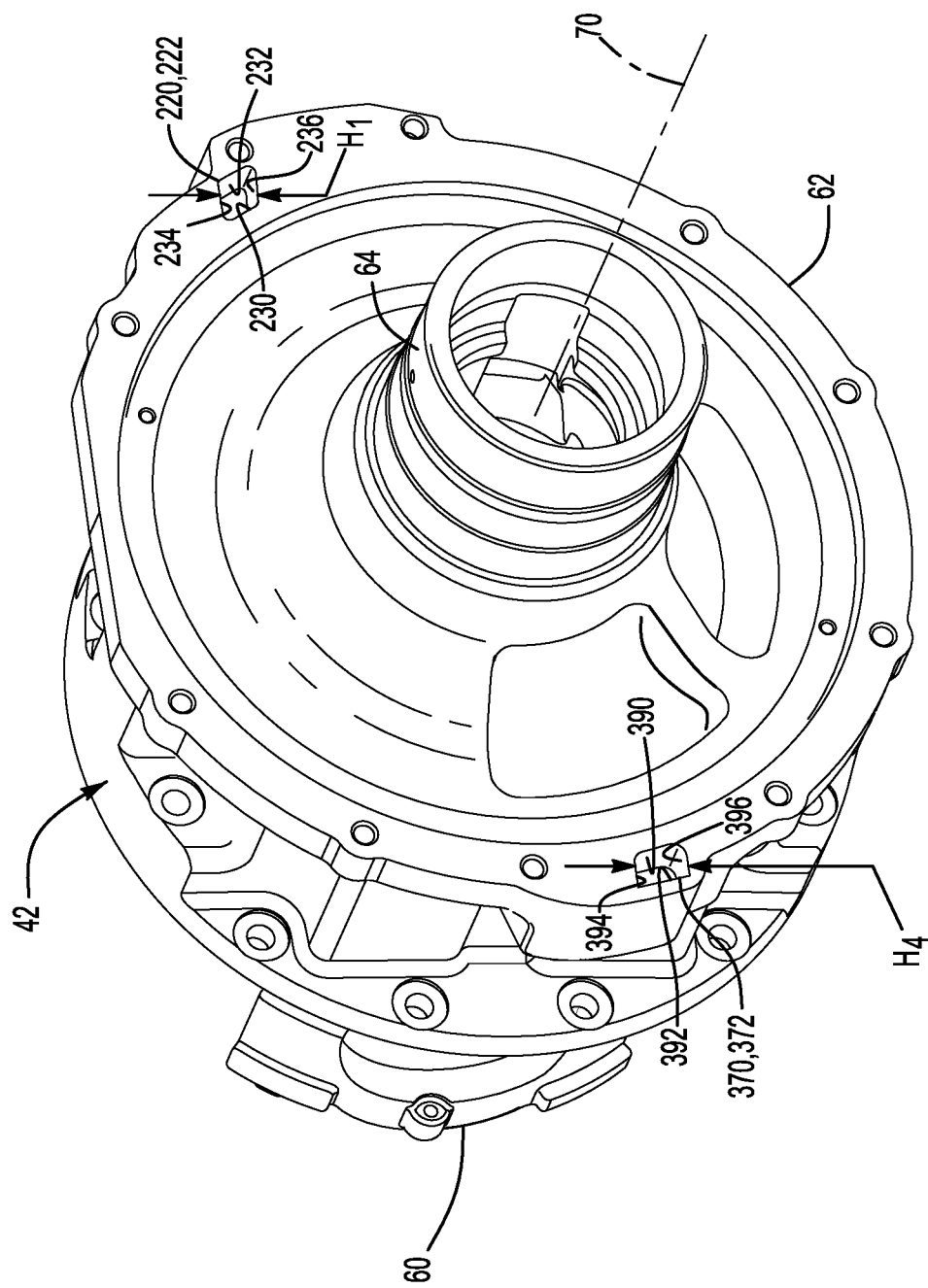
FIG. 4 is a perspective view of the differential carrier.

Referring to FIGS. 2 and 4, the bearing support wall 64 may support bearings that may rotatably support other components of the axle assembly 10. For example, the bearing support wall 64 may support bearings that may rotatably support a drive pinion 84, bearings that may rotatably support a rotor of the electric motor module 26, or both. The bearing support wall 64 may extend in an axial direction away from the axle housing 40 and may extend around the axis 70. The bearing support wall 64 may define a hole that may receive the drive pinion 84. The bearing support wall 64 may be integrally formed with the differential carrier 42 or may be a separate component that is fastened to the differential carrier 42.

Differential Assembly and Axle Shafts

Referring to FIGS. 2, 12, and 14, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth the mate or mesh with the teeth of a gear portion of a drive pinion 84. Accordingly, the differential assembly 22 may receive torque from the drive pinion via the ring gear 82 and transmit torque to the axle shafts 24.

The drive pinion 84 may provide torque to the ring gear 82. In an axle assembly that includes a gear reduction module 34, the drive pinion 84 may operatively connect the gear reduction module 34 to the differential assembly 22. In at least one configuration, the drive pinion 84 may be rotatable about the axis 70 and may be rotatably supported on another component, such as the bearing support wall 64.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26 may be mounted to the differential carrier 42 and may provide torque to the differential assembly 22 via the drive pinion 84. The electric motor module 26 may be primarily disposed outside the differential carrier 42. In addition, the electric motor module 26 may be axially positioned between the axle housing 40 and the gear reduction module 34. In at least one configuration, the electric motor module 26 may include a motor housing 100, a coolant jacket 102, a stator 104, a rotor 106, at least one rotor bearing assembly 108, and a cover 110.

Figure 5:
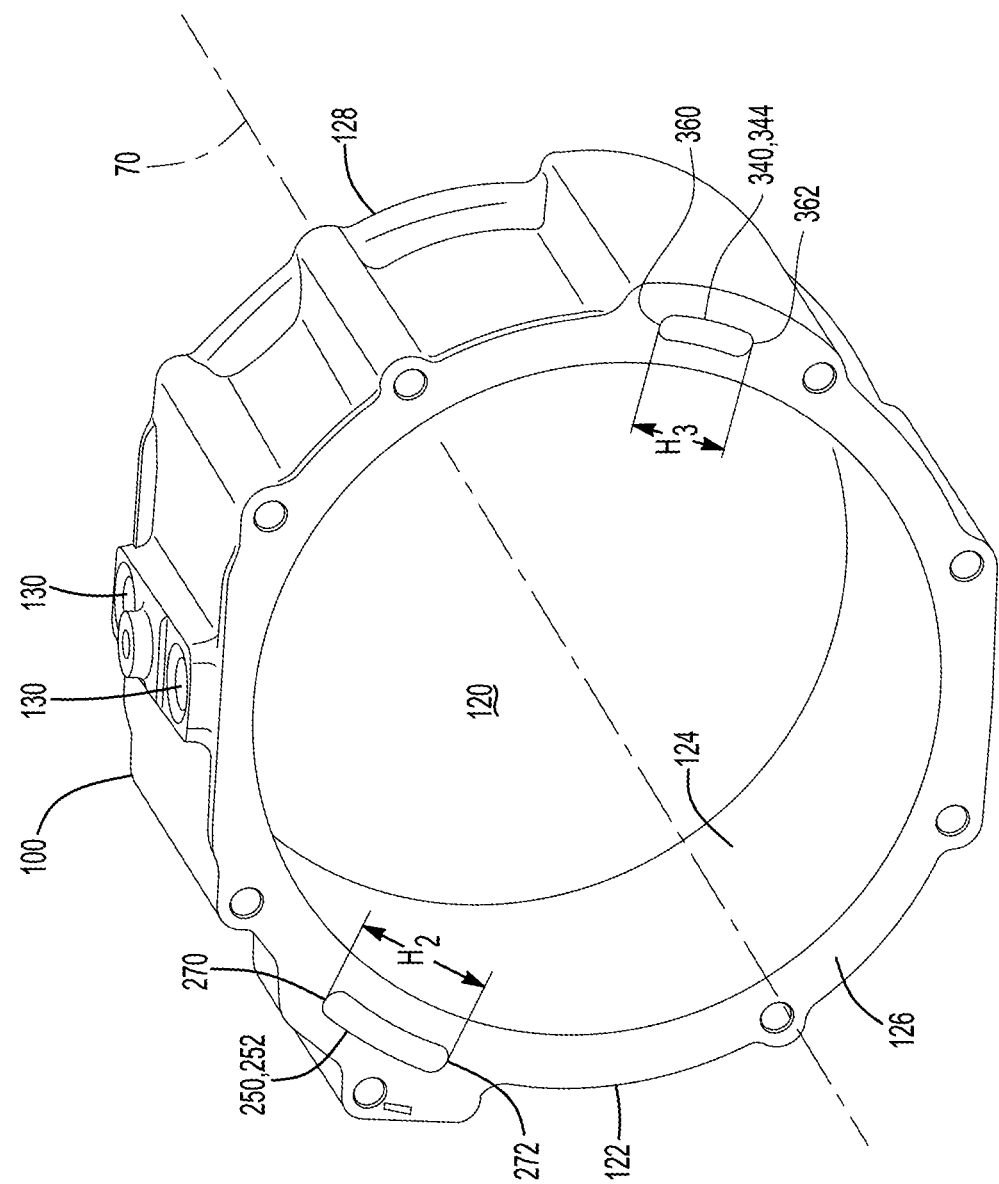
FIGS. 5 and 6 are perspective views of a motor housing that may be provided with the axle assembly.
Figure 6:
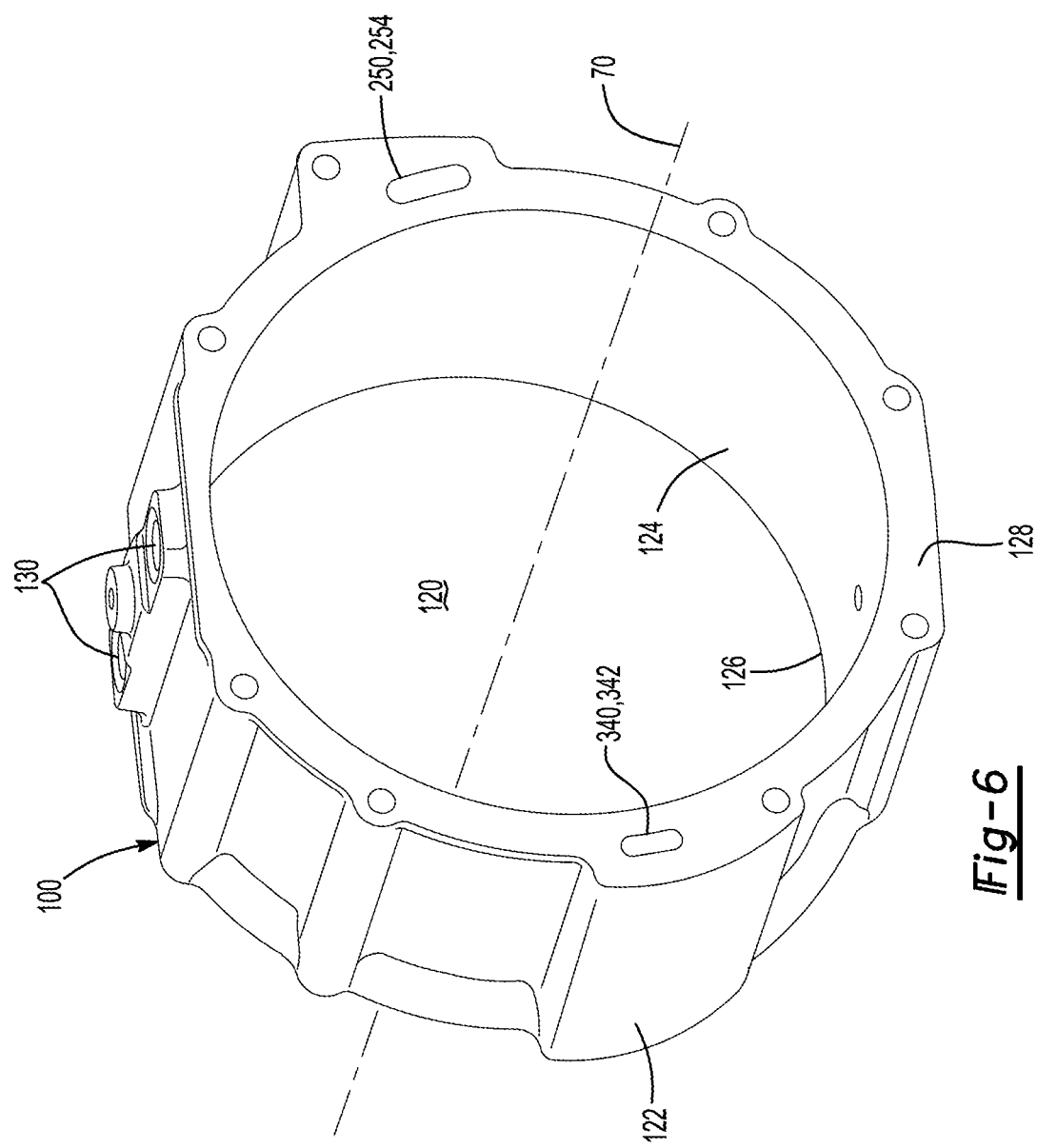
Figure 7:
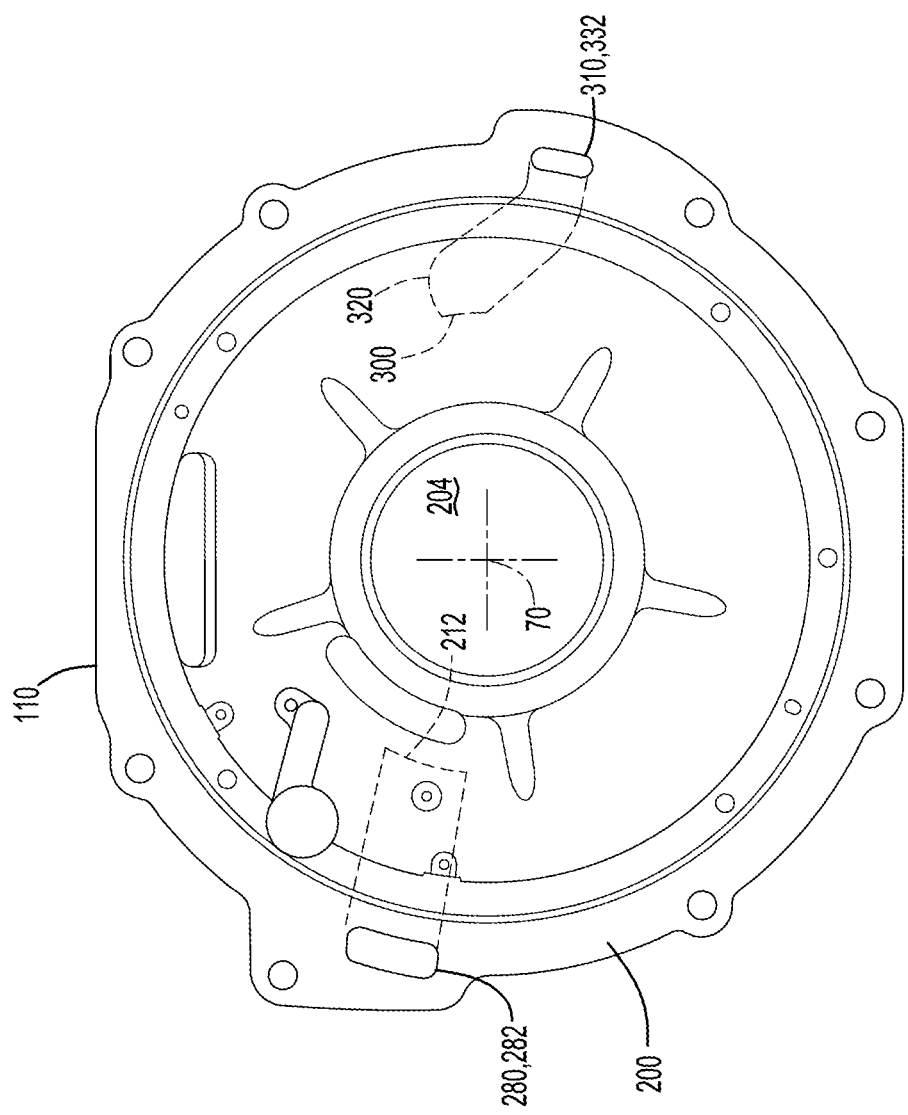
FIGS. 7 and 8 are opposing side views of a cover that may be provided with the axle assembly.

Referring to FIG. 2, the motor housing 100 may extend between the differential carrier 42 and the cover 110 and may be mounted to the differential carrier 42 and the cover 110. For example, the motor housing 100 may extend from the mounting flange 62 of the differential carrier 42 to the cover 110. As is best shown in FIGS. 5 and 6, the motor housing 100 may extend around the axis 70 and define a motor housing cavity 120. The motor housing cavity 120 may have a generally cylindrical configuration. As is best shown in FIG. 2, the motor housing 100 may extend continuously around and may be spaced apart from the bearing support wall 64 of the differential carrier 42. In at least one configuration and as is best shown in FIGS. 5 and 6, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. More specifically, the first end surface 126 may be disposed adjacent to the mounting flange 62 of the differential carrier 42. The motor housing 100 and the first end surface 126 may or may not be received inside the mounting flange 62.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as a through holes that may extend from the exterior side 122 to the interior side 124. The ports 130 may allow coolant, such as a fluid like water, a water/antifreeze mixture, or the like, to flow to and from the coolant jacket 102 as will be described in more detail below.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42 to the cover 110. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. A baffle may be provided with the coolant jacket 102 that may reverse the direction of coolant flow to help route coolant from the first port 130 to the second port 130.

The stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current. The rotor 106 may extend around and may be supported by the bearing support wall 64.

One or more rotor bearing assemblies 108 may rotatably support the rotor 106. For example, a rotor bearing assembly 108 may receive the bearing support wall 64 of the differential carrier 42 and may be received inside of the rotor 106. The rotor 106 may be operatively connected to the drive pinion 84. For instance, a coupling such as a rotor output flange 86 may operatively connect the rotor 106 to the gear reduction module 34, which in turn may be operatively connectable with the drive pinion 84.

Referring to FIGS. 2 and 7-10, the cover 110 may be mounted to the motor housing 100 and may be disposed opposite the axle housing 40 and the differential carrier 42. For example, the cover 110 may be mounted to the second end surface 128 of the motor housing 100. The cover 110 may be spaced apart from and may not engage the differential carrier 42. The cover 110 may be provided in various configurations. In at least one configuration, the cover 110 may include a first side 200 and a second side 202. The first side 200 may face toward and may engage the motor housing 100. The second side 202 may be disposed opposite the first side 200. The second side 202 may face away from the motor housing 100 and may be disposed opposite the motor housing 100. Cover 110 may also include a motor cover opening 204 in configurations having a gear reduction module 34.

Figure 11:
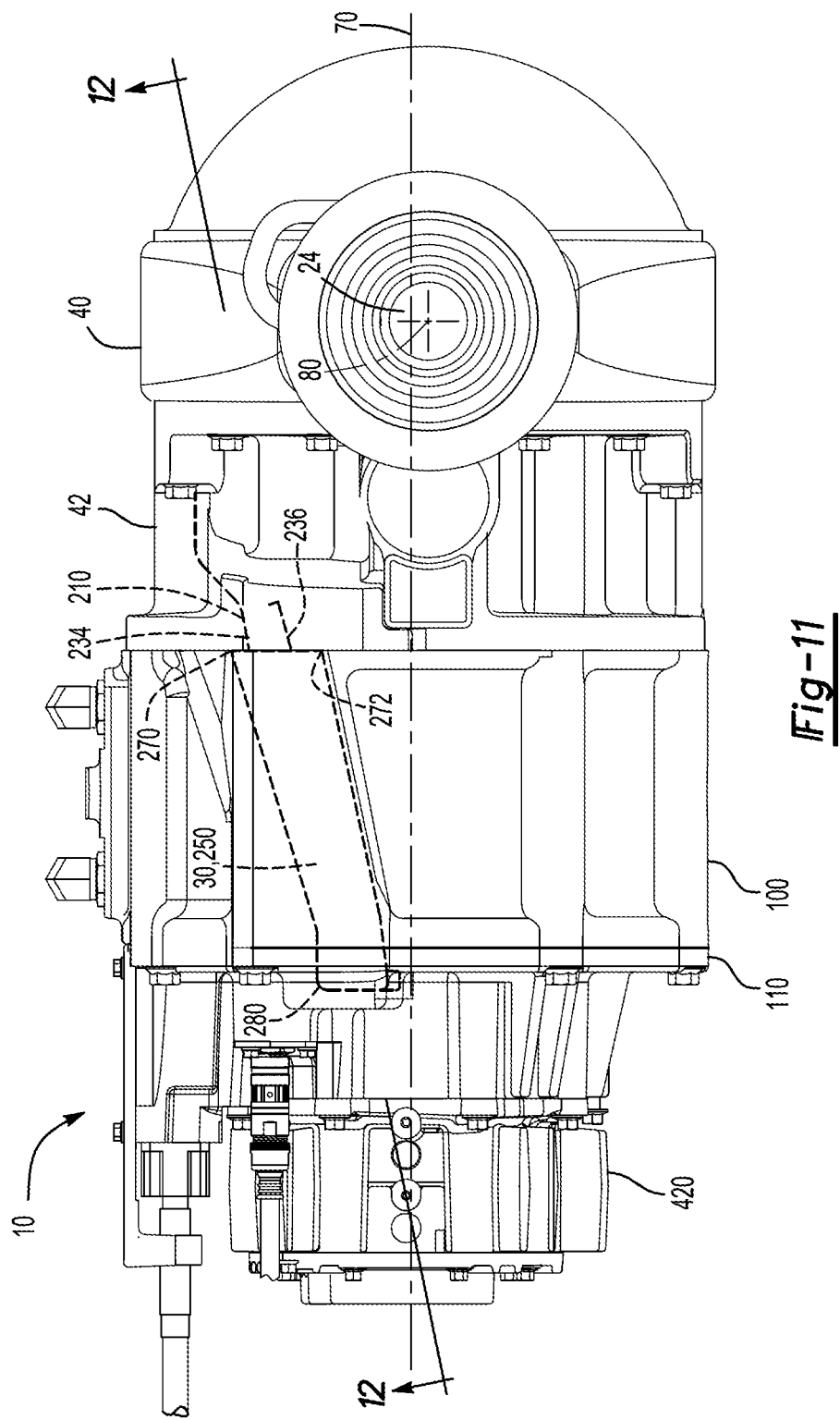
FIG. 11 is a side view of the axle assembly of FIG. 1.

Referring to FIGS. 11 and 12, the first lubricant passage 30 may route lubricant 56 from the axle housing 40 to help lubricate components that are disposed outside of the axle housing 40. The first lubricant passage 30 may receive lubricant 56 that is splashed by the differential assembly 22, such as when the differential assembly 22 rotates about the differential axis 80. For example, the ring gear 82 may splash lubricant 56 from the sump portion 54 and some splashed lubricant may enter the first lubricant passage 30. The first lubricant passage 30 may deliver lubricant 56 to the gear reduction module 34, the shift mechanism 36, components that are located adjacent to or inside the cover 110, or combinations thereof. As an example, the first lubricant passage 30 may route lubricant from the axle housing 40 to the cover 110. In at least one configuration, the first lubricant passage 30 may be completely disposed above the axis 70. In addition, the first lubricant passage 30 may have at least one inlet 210 and at least one outlet 212.

The inlet(s) 210 may receive lubricant 56 from the axle housing 40 and may be disposed further above the axis 70 than the outlet(s) 212. As such, the first lubricant passage 30 may slope downward from the inlet(s) 210 toward or to the outlet(s) 212.

The outlet(s) 212 may be disposed at an end of the first lubricant passage 30 that is disposed opposite the inlet(s) 210. The outlet(s) 212 may be vertically positioned closer to the axis 70 than the inlet(s) 210.

The first lubricant passage 30 may be configured as a through hole that may extend through at least the motor housing 100. In at least one configuration, the differential carrier 42, the motor housing 100, and the cover 110 may cooperate to at least partially define the first lubricant passage 30. For instance, the first lubricant passage 30 may be at least partially defined by through holes in the differential carrier 42, the motor housing 100, and the cover 110. These through holes may be fluidly connected to each other. The text below primarily describes the first lubricant passage 30 that may be defined by these three components.

Referring to FIGS. 3, 4, and 12, the differential carrier 42 may define the inlet 210 and a first portion 220 of the first lubricant passage 30. The first portion 220 may also be referred to as the portion of the first lubricant passage 30 that is defined by the differential carrier 42. The inlet 210 and the first portion 220 may be disposed proximate the top of the differential carrier 42. In at least one configuration, the inlet 210 and the first portion 220 may be disposed above the case or housing of the differential assembly 22. The first portion 220 may extend from the inlet 210 to a first outlet port 222, which is best shown in FIG. 4. For example, the first portion 220 may extend in a generally horizontal direction from the inlet 210 toward an exterior side of the differential carrier 42 or to the left from the perspective shown in FIG. 3. The first portion 220 may then change direction at a bend 224, which is best shown in FIG. 12, and may extend toward the mounting flange 62 and the motor housing 100 and to the first outlet port 222.

Referring to FIG. 4, the region of the first portion 220 that extends from the bend 224 to the first outlet port 222 may have an inner wall 230 and an outer wall 232. The inner wall 230 may be disposed closer to the axis 70 than the outer wall 232. The inner wall 230, the outer wall 232, or both may extend along an arc. For instance, the inner wall 230, the outer wall 232, or both may have a portion that may be radially disposed with respect to the axis 70.

The first outlet port 222 may also have a top wall 234 and a bottom wall 236. The top wall 234 may be disposed above the bottom wall 236 and may extend from the inner wall 230 to the outer wall 232. The bottom wall 236 may be spaced apart from the top wall 234 and may extend from the inner wall 230 to the outer wall 232. The first outlet port 222 may have a height $H_1$ that may extend from the top wall 234 to the bottom wall 236.

Referring to FIGS. 5, 6 and 12, the motor housing 100 may define a second portion 250 of the first lubricant passage 30. The second portion 250 may also be referred to as the portion of the first lubricant passage 30 that is defined by the motor housing 100.

The second portion 250 may be disposed between the exterior side 122 and the interior side 124 of the motor housing 100. In addition, the second portion 250 may be radially positioned further from the axis 70 than the stator 104 and the coolant jacket 102. For instance, the second portion 250 may be disposed between the coolant jacket 102 and the exterior side 122 of the motor housing 100. The second portion 250 may extend substantially parallel to the axis 70. It is noted that the second portion 250 extends substantially parallel to the axis 70 in FIG. 12 but appears to be tapered from the differential carrier 42 to the cover 110 due to the angularity of the section plane and the curvature of the second portion 250. The second portion 250 may have a second inlet port 252 and a second outlet port 254 and may extend from the second inlet port 252 to the second outlet port 254.

The second inlet port 252 may be disposed at a first end surface 126 of the motor housing 100. In at least one configuration, the second inlet port 252 may be at least partially disposed above the second outlet port 254. The second inlet port 252 may be disposed adjacent to the first outlet port 222 and may be fluidly connected to the first outlet port 222. In at least one configuration, the second inlet port 252 may have an upper end 270 and a lower end 272 as is best shown in FIG. 5.

The upper end 270 may be disposed at the top of the second inlet port 252.

The lower end 272 may be disposed opposite the upper end 270 and may be disposed proximate the bottom of the second inlet port 252. The second inlet port 252 may have a height $H_2$ that may extend from the upper end 270 to the lower end 272. The height $H_2$ of the second inlet port 252 may be greater than the height $H_1$ of the first outlet port 222. For instance, the upper end 270 may be disposed above and may be spaced apart from the top wall 234 of the first outlet port 222, the lower end 272 may be disposed below and may be spaced apart from the bottom wall 236 of the first outlet port 222, or both.

Providing a second inlet port 252 with a greater height than the first outlet port 222 may allow the motor housing 100 to be standardized while allowing the motor housing 100 to fluidly connect with different differential carrier designs that may position the first outlet port 222 at different locations. For instance, the top wall 234 of the first outlet port 222 may be positioned at a higher elevation or closer to the upper end 270 in configurations where the differential carrier 42 supports a larger differential assembly 22 or a differential assembly 22 having a larger diameter ring gear 82. Conversely, the bottom wall 236 of the first outlet port 222 may be positioned at a lower elevation or closer to the lower end 272 in configurations where the differential carrier 42 supports a smaller differential assembly 22 or a differential assembly 22 having a smaller diameter ring gear 82.

Referring to FIG. 6, the second outlet port 254 may be disposed at the second end surface 128 that may be disposed opposite the first end surface 126.

Referring to FIGS. 7-9 and 12, the cover 110 may define a third portion 280 of the first lubricant passage 30. The third portion 280 may also be referred to as the portion of the first lubricant passage 30 that is defined by the cover 110.

The third portion 280 may be configured as a through hole that may extend through the cover 110. As such, the third portion 280 may be disposed between an exterior side of the cover 110 and an interior side of the cover 110. The third portion 280 may extend from a third inlet port 282 to the outlet 212. Accordingly, the cover 110 may define the outlet 212 of the first lubricant passage 30 in at least one configuration.

The third inlet port 282 may be fluidly connected to the second outlet port 254. The third inlet port 282 may be disposed at an end of the cover 110 that may face toward and may engage the second end surface 128 of the motor housing 100. In at least one configuration, the third portion 280 may extend axially or substantially parallel to the axis 70 from the third inlet port 282 to a bend 286, which is best shown in FIG. 12. The third portion 280 may then change direction at the bend 286 and may extend toward the axis 70 and to the outlet 212. Lubricant 56 may exit the outlet 212 and may be provided to components that may be remotely positioned from the axle housing 40, such as the gear reduction module 34 and the shift mechanism 36.

Figure 13:
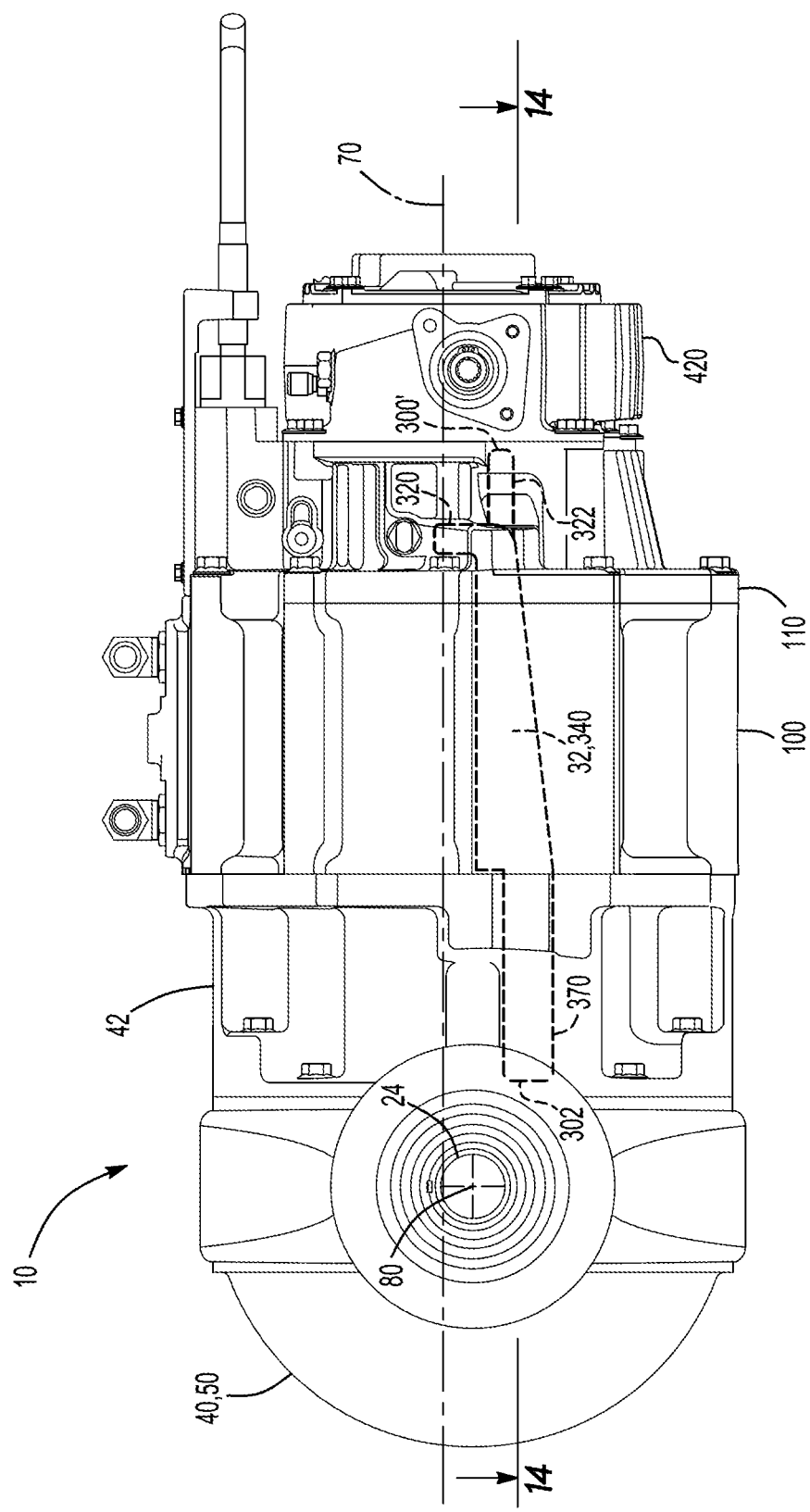
FIG. 13 is a side view of the axle assembly opposite that shown in FIG. 11.

Referring to FIGS. 13 and 14, the second lubricant passage 32 may return lubricant 56 to the axle housing 40. For instance, the second lubricant passage 32 may route lubricant from the gear reduction module 34, the shift mechanism 36, the cover 110, or combinations thereof to the axle housing 40. The second lubricant passage 32 may be partially or completely disposed below the axis 70. With additional reference to FIG. 10 the second lubricant passage 32 may have at least one inlet 300, 300' and at least one outlet 302.

The inlet(s) 300 may receive lubricant 56 from the cover 110 and may be disposed further above the axis 70 than the outlet(s) 302. As such, the second lubricant passage 32 or a portion thereof may slope downward from the inlet(s) 300, 300' toward or to the outlet(s) 302.

The second lubricant passage 32 may be configured as a through hole that may extend through at least the motor housing 100. In at least one configuration, the differential carrier 42, the motor housing 100, and the cover 110 may cooperate to at least partially define the second lubricant passage 32. For instance, the second lubricant passage 32 may be at least partially defined by through holes in the differential carrier 42, the motor housing 100, and the cover 110. These through holes may be fluidly connected to each other. The text below primarily describes the second lubricant passage 32 that may be defined by these three components.

Figure 10:
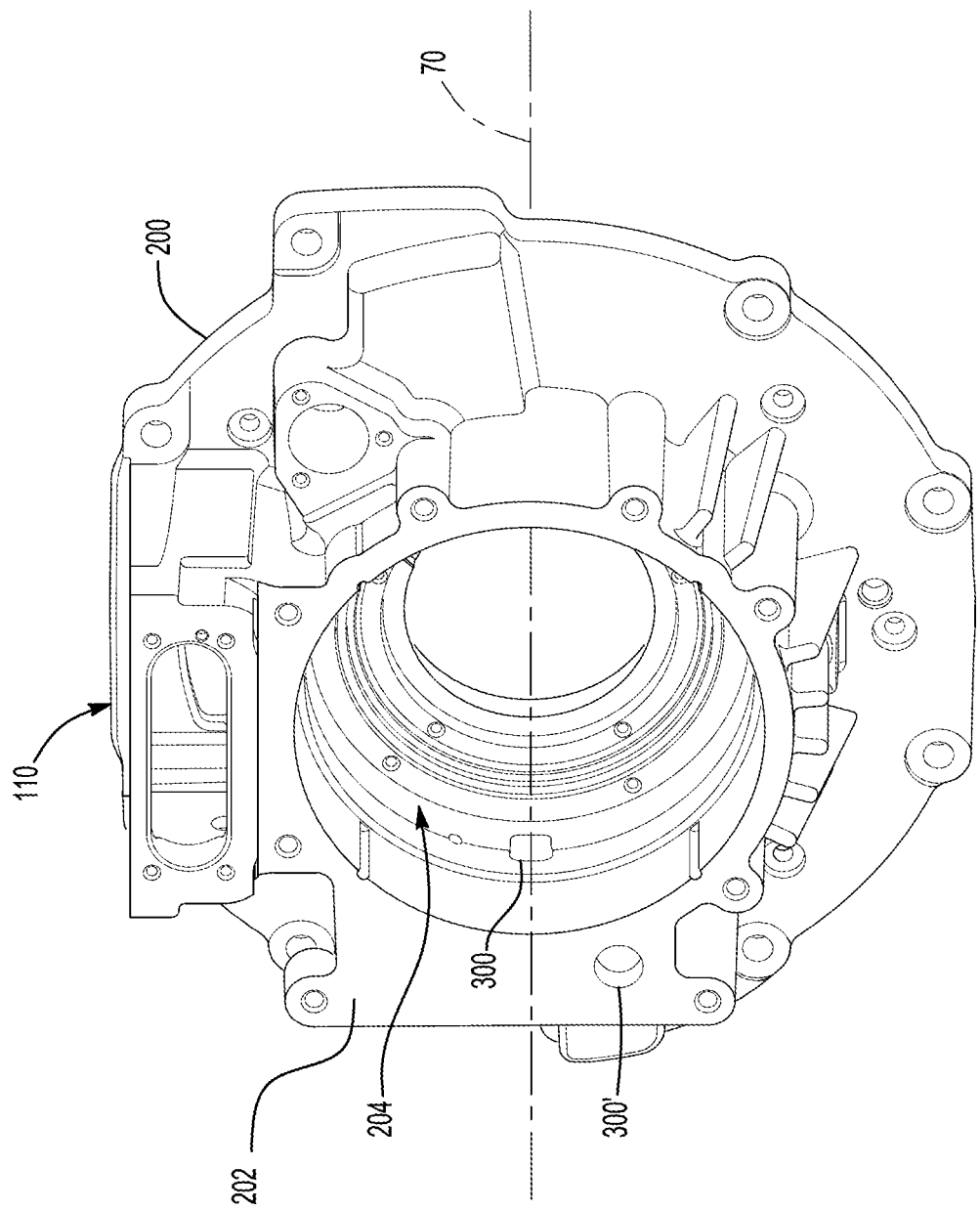

Referring to FIGS. 7-10 and 14, the cover 110 may define the inlet(s) 300, 300' and a first portion 310 of the second lubricant passage 32. The first portion 310 may also be referred to as the portion of the second lubricant passage 32 that is defined by the cover 110. As is best shown in FIG. 10, the cover 110 may include multiple inlets for the second lubricant passage 32. For clarity in reference, reference number 300 may designate a first inlet while reference number 300' may designate a second inlet. The first inlet 300, the second inlet 300', or both may be disposed further above the axis 70 than the outlet 302.

The first inlet 300 may face toward the axis 70. In at least one configuration, the first inlet 300 may face inward toward the axis 70. As such, the first inlet 300 may be disposed closer to the axis 70 than the second inlet 300'. In addition, the first inlet 300 may be axially positioned along the axis 70 closer to the motor housing 100 than the second inlet 300' as is best shown with respect to FIG. 10. The first inlet 300 may also be disposed above the second inlet 300'. The first inlet 300 is not visible in FIG. 14 due to the positioning of the section plane.

The second inlet 300' may be spaced apart from the first inlet 300. In at least one configuration, the second inlet 300' may be disposed in the second side 202 of the cover 110. As such, the second inlet 300' may face away from the motor housing 100.

Figure 8:
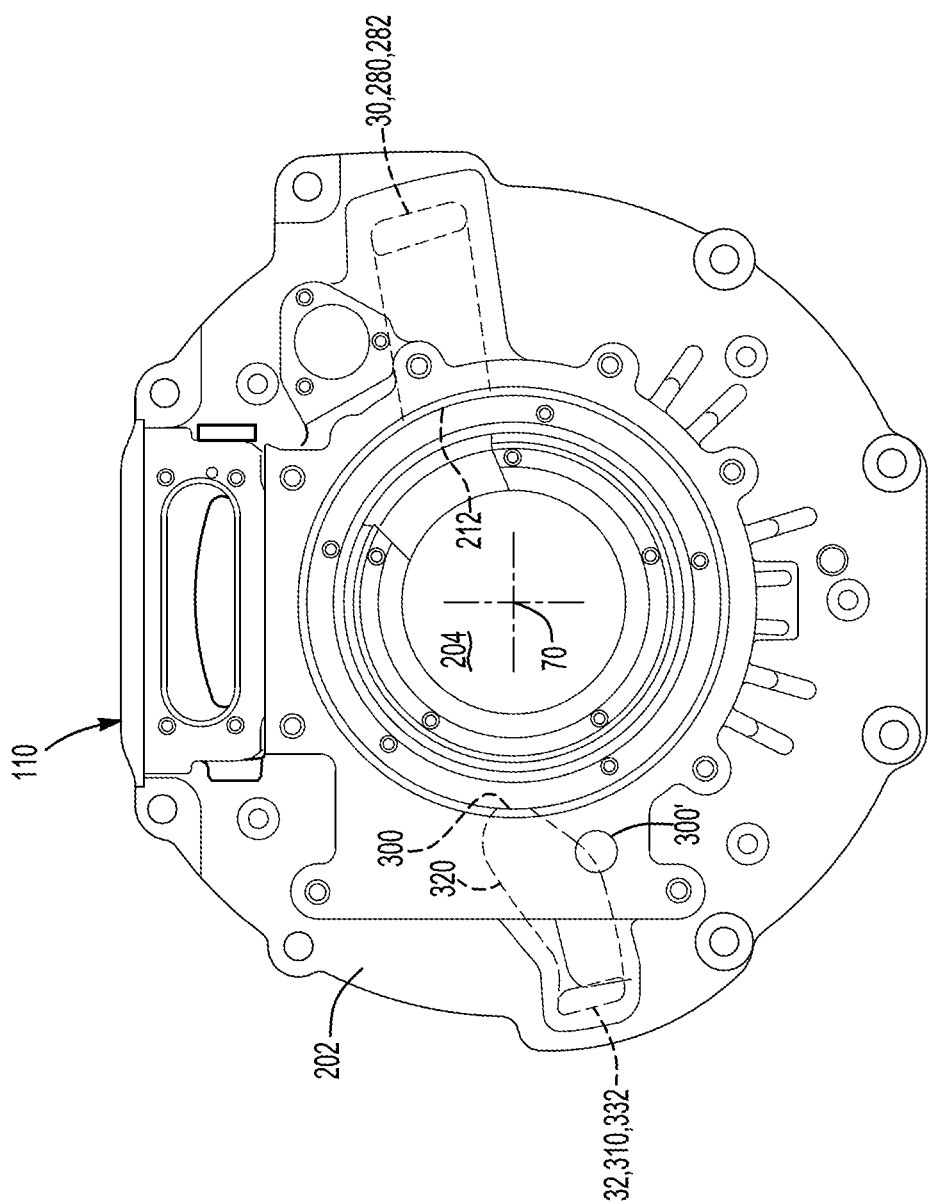
Figure 9:
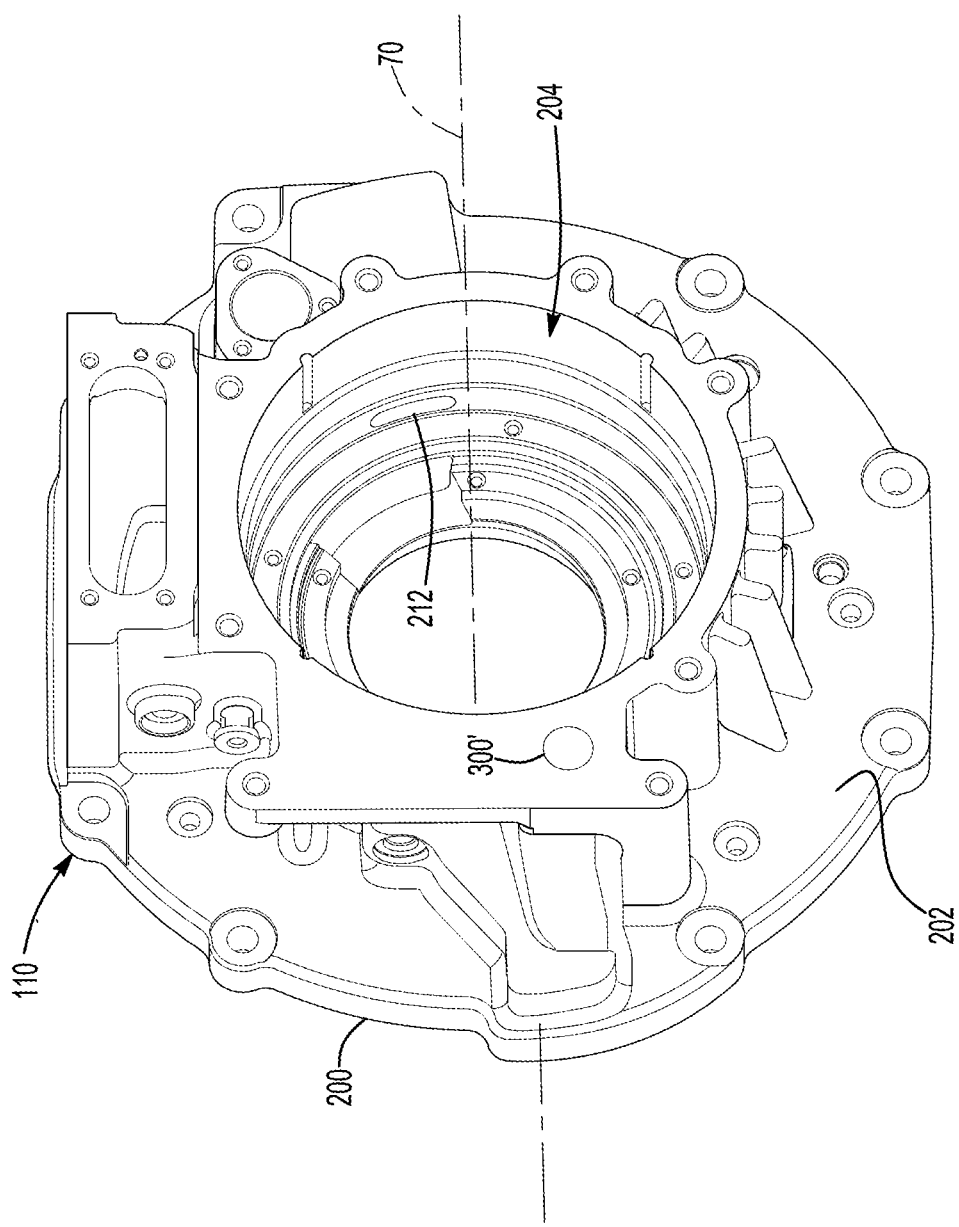
FIGS. 9 and 10 are perspective views of the cover.

Referring to FIGS. 8 and 13, the first portion 310 may have a first branch 320 and a second branch 322. The first branch 320 may extend from the first inlet 300 in a generally horizontal direction from the first inlet 300 toward an exterior side of the cover 110 or to the left from the perspective shown in FIG. 8. Referring to FIG. 13, the second branch 322 may extend in a generally axial direction from the second inlet 300' to the first branch 320. As such, the first branch 320 may be fluidly connected to the second branch 322 in at least one configuration.

Referring to FIG. 14, the first branch 320 may change direction at a bend 324 and may extend toward the motor housing 100 and to a first outlet port 332 of the first portion 310.

Referring to FIGS. 5, 6 and 14, the motor housing 100 may define a second portion 340 of the second lubricant passage 32. The second portion 340 may also be referred to as the portion of the second lubricant passage 32 that is defined by the motor housing 100.

The second portion 340 may be disposed between the exterior side 122 and the interior side 124 of the motor housing 100. In addition, the second portion 340 may be radially positioned further from the axis 70 than the stator 104 and the coolant jacket 102. For instance, the second portion 340 may be disposed between the coolant jacket 102 and the exterior side 122 of the motor housing 100. The second portion 340 may extend substantially parallel to the axis 70. The second portion 340 may have a second inlet port 342 and a second outlet port 344 and may extend from the second inlet port 342 to the second outlet port 344.

The second inlet port 342 may be disposed at the second end surface 128 of the motor housing 100 and may face toward the cover 110. The second inlet port 342 may be fluidly connected to the first outlet port 332.

The second outlet port 344 may be disposed at the first end surface 126 of the motor housing 100 and may face toward the differential carrier 42. The second outlet port 344 may be at least partially disposed below the second inlet port 342. In at least one configuration, the second outlet port 344 may have an upper end 360 and a lower end 362 as is best shown in FIG. 5.

The upper end 360 may be disposed at the top of the second outlet port 344.

The lower end 362 may be disposed opposite the upper end 360 and may be disposed proximate the bottom of the second outlet port 344. The second outlet port 344 may have an outlet port height $H_3$ that may extend from the upper end 360 to the lower end 362.

Referring to FIGS. 3, 4, and 14, the differential carrier 42 may define the outlet 302 and a third portion 370 of the second lubricant passage 32. The third portion 370 may also be referred to as the portion of the second lubricant passage 32 that is defined by the differential carrier 42.

The third portion 370 may be configured as a through hole that may extend through the differential carrier 42. As such, the third portion 370 may be disposed between an exterior side of the differential carrier 42 and an interior side of the differential carrier 42. The third portion 370 may extend from the third inlet port 372 to the outlet 302.

The third inlet port 372 may be fluidly connected to the second outlet port 344. The third inlet port 372 may be disposed at an end of the differential carrier 42 that may face toward and may engage the first end surface 126 of the motor housing 100. The third portion 370 may generally extend axially from the third inlet port 372 to the outlet 302.

Referring to FIG. 14, one or more bends may be provided between the third inlet port 372 and the outlet 302. For instance, the third portion 370 may extend from the third inlet port 372 to a first bend 380 at which the third portion 370 may extend inward toward the axis 70. The third portion 370 may then extend to a second bend 382 at which the third portion 370 may then resume extending in an axial direction toward the axle housing 40. The third portion 370 may then extend to a third bend 384 at which the third portion 370 may extend away from the axis 70 and then may extend in a generally axial direction toward the axle housing 40 and to the outlet 302. In such a configuration, the outlet 302 may be disposed outboard from a bearing support 60 and a bearing that may rotatably support the differential assembly 22. It is contemplated that a greater or lesser number of bends may be provided.

Referring to FIG. 4, the third portion 370 or a region thereof may have an inner wall 390 and an outer wall 392. The inner wall 390 may be disposed closer to the axis 70 than the outer wall 392. The inner wall 390, the outer wall 392, or both may extend along an arc. For instance, the inner wall 390, the outer wall 392, or both have a portion that may be radially disposed with respect to the axis 70.

The third inlet port 372 may also have a top wall 394 and a bottom wall 396. The top wall 394 may be disposed above the bottom wall 396 and may extend from the inner wall 390 to the outer wall 392. The bottom wall 396 may be spaced apart from the top wall 394 and may extend from the inner wall 390 to the outer wall 392. The third inlet port 372 may have a height $H_4$ that may extend from the top wall 394 to the bottom wall 396. The height $H_3$ of the second outlet port 344 may be greater than the height $H_4$ of the third inlet port 372. For instance, the upper end 360 of the second outlet port 344 may be disposed above and may be spaced apart from the top wall 394 of the third inlet port 372, the lower end 362 of the second outlet port 344 may be disposed below and may be spaced apart from the bottom wall 396 of the third inlet port 372, or both. Such a configuration may provide compatibility with different differential carriers 42 and different sized differential assemblies 22 as previously discussed.

Referring to FIGS. 12 and 14, the first lubricant passage 30 and the second lubricant passage 32 may be disposed on opposite sides of a center plane 400 that may extend vertically through the axis 70. The axis 70 may be completely disposed in the center plane 400.

The first lubricant passage 30 and the second lubricant passage 32 may allow lubricant 56 to be circulated between different portions of the axle assembly 10, such as the sump portion 54 and the gear reduction module 34. As such, the first lubricant passage 30 and the second lubricant passage 32 may allow a common lubricant to be used to lubricate components of the differential assembly 22 and the gear reduction module 34. Moreover, this configuration may allow the housing assembly 20 to be provided without separate lubricant reservoirs or separate sump portions for the axle housing 40 and the gear reduction module 34, which may allow seals that separate the lubricant reservoirs to be eliminated.

In addition, the first lubricant passage 30 and the second lubricant passage 32 may provide a flow path that is separate from the drive pinion 84 or cavity that receives the drive pinion 84. Routing lubricant through the drive pinion 84 or a cavity that receives the drive pinion 84 may make it difficult to return lubricant 56 to the sump portion 54 due to the obstruction or narrower flow path presented by the drive pinion 84 and its supporting bearings. Routing lubricant 56 via the first lubricant passage 30 and the second lubricant passage 32 may reduce the level of lubricant 56 around the drive pinion 84, which in turn may reduce drag on the drive pinion 84 and may help improve operating efficiency of the axle assembly 10.

The first lubricant passage 30 and the second lubricant passage 32 may allow lubricant 56 to be circulated inside the axle assembly 10 and without conduits or hoses that are routed outside the housing assembly 20 where they may be susceptible to damage.

The first lubricant passage 30 and the second lubricant passage 32 may facilitate heat transfer. Thermal energy or heat may be transferred between the coolant in the coolant jacket 102 and the lubricant 56 in the first lubricant passage 30, the second lubricant passage 32, or both. As an example, heat may be transferred from the coolant to the lubricant 56 when the coolant temperature exceeds the lubricant temperature or vice versa. Heat transfer from the coolant to the lubricant 56 may help heat the lubricant 56 in cold operating conditions, which may help improve lubricant flow and/or lubricating performance. Heat transfer from the lubricant 56 to the coolant may help reduce the lubricant temperature, which may help extend the life of the lubricant 56.

Gear Reduction Module

Referring to FIG. 2, the gear reduction module 34, if provided, may transmit torque from the electric motor module 26 to the differential assembly 22. As such, the gear reduction module 34 may be operatively connected to the electric motor module 26 and the differential assembly 22. The gear reduction module 34 may be disposed outside of the differential carrier 42 and may be primarily disposed outside of the electric motor module 26, thereby providing a modular construction that may be mounted to the electric motor module 26 when gear reduction is desired.

The gear reduction module 34 may be provided in various configurations, such as planetary gear set configurations and non-planetary gear set configurations. Referring to FIGS. 2 and 12, an example of a gear reduction module 34 that has a planetary gear set is shown. In such a configuration, the gear reduction module 34 may include a sun gear 410, planet gears 412, a planetary ring gear 414, and a planet gear carrier 416.

The sun gear 410 may be operatively connected to the rotor 106, such as via the rotor output flange 86. The sun gear 410 may also be rotatable about the axis 70 and may receive the drive pinion 84.

The planet gears 412 may be rotatably disposed between the sun gear 410 and the planetary ring gear 414. Each planet gear 412 may have teeth that may mesh with the sun gear 410 and the planetary ring gear 414.

The planetary ring gear 414 may extend around the axis 70 and may receive the planet gears 412.

The planet gear carrier 416 may be rotatable about the axis 70 and may rotatably support the planet gears 412.

Shift Mechanism

Referring to FIG. 2, the shift mechanism 36 may cooperate with the gear reduction module 34 to provide a desired gear reduction ratio to change the torque provided from the electric motor module 26 to the differential assembly 22, and hence to the axle shafts 24 of the axle assembly 10. In at least one configuration, the shift mechanism 36 may operatively connect the sun gear 410 to the drive pinion 84 to provide a first drive gear ratio and may operatively connect the planet gear carrier 416 to the drive pinion 84 to provide a second drive gear ratio that may differ from the first drive gear ratio.

The shift mechanism 36 may have any suitable configuration. For instance, the shift mechanism 36 may include one of more clutches of any suitable type.

The shift mechanism 36 may be received in a shift mechanism housing 420. The shift mechanism housing 420 may be disposed on the cover 110 and may be mounted to a side of the cover 110 that may be disposed opposite the differential carrier 42. Optionally, the shift mechanism housing 420 may facilitate mounting of an actuator that may actuate the shift mechanism 36.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing that receives a differential assembly and that at least partially defines a sump portion that receives lubricant;
   a differential carrier that is mounted to the axle housing and supports the differential assembly;
   an electric motor module that includes:
      a motor housing that is mounted to the differential carrier, wherein the motor housing receives a stator and receives a rotor that is rotatable about an axis;
      a cover that is mounted to the motor housing opposite the differential carrier, wherein the differential carrier, the motor housing, and the cover cooperate to at least partially define a first lubricant passage that receives lubricant from the axle housing and routes lubricant to the cover, wherein a portion of the first lubricant passage that is defined by the motor housing is radially positioned further from the axis than the stator; and
      a coolant jacket that is received in the motor housing and extends from the motor housing to the stator, wherein the portion of the first lubricant passage that is defined by the motor housing is disposed between the coolant jacket and an exterior side of the motor housing that faces away from the axis.

2. The axle assembly of claim 1 wherein the first lubricant passage is completely disposed above the axis.

3. The axle assembly of claim 1 wherein the differential carrier defines an inlet of the first lubricant passage and the cover defines an outlet of the first lubricant passage, wherein the inlet is disposed further above the axis than the outlet.

4. The axle assembly of claim 3 wherein the first lubricant passage slopes downward from the inlet toward the outlet.

5. The axle assembly of claim 1 wherein the first lubricant passage is at least partially defined by through holes in the differential carrier, the motor housing, and the cover.

6. The axle assembly of claim 1 wherein the portion of the first lubricant passage that is defined by the motor housing has an inlet port that has an upper end and a lower end disposed opposite the upper end, and a portion of the first lubricant passage that is defined by the differential carrier has an outlet port that is disposed adjacent to the inlet port, wherein the upper end is disposed above and is spaced apart from the outlet port.

7. An axle assembly comprising:
an axle housing that receives a differential assembly and that at least partially defines a sump portion that receives lubricant,
a differential carrier that is mounted to the axle housing and supports the differential assembly:
an electric motor module that includes:
  a motor housing that is mounted to the differential carrier, wherein the motor housing receives a stator and receives a rotor that is rotatable about an axis; and
  a cover that is mounted to the motor housing opposite the differential carrier, wherein the differential carrier, the motor housing, and the cover cooperate to at least partially define a first lubricant passage that receives lubricant from the axle housing and routes lubricant to the cover, wherein a portion of the first lubricant passage that is defined by the motor housing is radially positioned further from the axis than the stator and has an inlet port that has an upper end and a lower end disposed opposite the upper end, and a portion of the first lubricant passage that is defined by the differential carrier has an outlet port that is disposed adjacent to the inlet port, wherein the lower end is disposed below and is spaced apart from the outlet port.

8. An axle assembly comprising:
an axle housing that receives a differential assembly and that at least partially defines a sump portion that receives lubricant;
a differential carrier that is mounted to the axle housing and supports the differential assembly;
an electric motor module that includes:
  a motor housing that is mounted to the differential carder, wherein the motor housing receives a stator and receives a rotor that is rotatable about an axis; and
  a cover that is mounted to the motor housing opposite the differential carrier, wherein the differential carrier the motor housimr and the cover c to at least partially define a first lubricant passage that receives lubricant from the axle housing and routes lubricant to the cover, wherein a portion of the first lubricant passage that is defined by the motor housing is radially positioned further from the axis than the stator, and the differential carrier, the motor housing, and the cover cooperate to at least partially define a second lubricant passage that returns lubricant to the axle housing, wherein a portion of the second lubricant passage that is defined by the motor housing is radially positioned further from the axis than the stator.

9. The axle assembly of claim 8 wherein the second lubricant passage is completely disposed below the axis.

10. The axle assembly of claim 8 wherein the first lubricant passage and the second lubricant passage are disposed on opposite sides of a center plane that extends vertically through the axis, the axis being completely disposed in the center plane.

11. The axle assembly of claim 8 wherein the cover defines a first inlet of the second lubricant passage and the differential carrier at least partially defines an outlet of the second lubricant passage, wherein the first inlet is disposed further above the axis than the outlet.

12. The axle assembly of claim 11 wherein the second lubricant passage slopes downward from the first inlet toward the outlet.

13. The axle assembly of claim 11 wherein the cover defines a second inlet of the second lubricant passage that extends from a side of the cover that is disposed opposite the motor housing.

14. The axle assembly of claim 13 wherein the first inlet is disposed closer to the axis and the motor housing than the second inlet and the first inlet is disposed above the second inlet.

15. The axle assembly of claim 8 wherein the electric motor module includes a coolant jacket that is received in the motor housing and extends from the motor housing to the stator, wherein the portion of the second lubricant passage that is defined by the motor housing is disposed between the coolant jacket and an exterior side of the motor housing that faces away from the axis.

16. The axle assembly of claim 15 wherein the coolant jacket has a channel that receives a coolant and heat is transferred between the coolant and lubricant in the second lubricant passage.

17. The axle assembly of claim 8 wherein the portion of the second lubricant passage that is defined by the motor housing has an outlet port that has an upper end and a lower end disposed opposite the upper end, and a portion of the second lubricant passage that is defined by the differential carrier has an inlet port that is disposed adjacent to the outlet port of the motor housing, wherein the upper end is disposed above and is spaced apart from the inlet port of the differential carrier.

18. The axle assembly of claim 8 wherein the portion of the second lubricant passage that is defined by the motor housing has an outlet port that has an upper end and a lower end disposed opposite the upper end, and a portion of the second lubricant passage that is defined by the differential carrier has an inlet port that is disposed adjacent to the outlet port of the motor housing, wherein the lower end is disposed below and is spaced apart from the inlet port of the differential carrier.

19. The axle assembly of claim 8 wherein the electric motor module includes a coolant jacket that is received in the motor housing and extends from the motor housing to the stator, wherein the portion of the first lubricant passage that is defined by the motor housing is disposed between the coolant jacket and an exterior side of the motor housing that faces away from the axis.

20. The axle assembly of claim 19 wherein the coolant jacket has a channel that receives a coolant and heat is transferred between the coolant and lubricant in the first lubricant passage.

* * * * *

UNITED STATES PATENT AND TRADEMARK OFFICE
CERTIFICATE OF CORRECTION

| | |
|---|---|
| PATENT NO. | : 11,255,424 B2 |
| APPLICATION NO. | : 16/813452 |
| DATED | : February 22, 2022 |
| INVENTOR(S) | : Martin |

It is certified that error appears in the above-identified patent and that said Letters Patent is hereby corrected as shown below:

In the Claims

Column 13, Lines 45-46, Claim 8:
After "a motor housing that is mounted to the differential"
Delete "carder"
Insert --carrier--.

Column 13, Lines 50-51, Claim 8:
After "wherein the differential carrier"
Delete "the motor housimr and the cover c"
Insert --, the motor housing, and the cover cooperate--.

Signed and Sealed this
Thirty-first Day of January, 2023

Katherine Kelly Vidal
*Director of the United States Patent and Trademark Office*